United States Patent [19]

Conibear

[11] 4,133,136
[45] Jan. 9, 1979

[54] ROTATING FRAME ANIMAL TRAP WITH IMPROVED TRIGGER

[75] Inventor: Frank R. Conibear, Victoria, Canada
[73] Assignee: Woodstream Corporation, Lititz, Pa.
[21] Appl. No.: 845,405
[22] Filed: Oct. 25, 1977
[51] Int. Cl.² ............................................. A01M 23/26
[52] U.S. Cl. ........................................................ 43/92
[58] Field of Search ..................... 43/88, 92, 93, 94, 95

[56] References Cited

U.S. PATENT DOCUMENTS

| | | | |
|---|---|---|---|
| 1,135,626 | 4/1915 | Schreck | 43/94 |
| 1,231,065 | 6/1917 | Pues | 43/92 |
| 1,305,588 | 6/1919 | Cherep | 43/93 X |
| 4,071,972 | 2/1978 | Conibear | 43/92 |

Primary Examiner—Nicholas P. Godici
Attorney, Agent, or Firm—Holman & Stern

[57] ABSTRACT

An animal trap having two similar frames each having jaw forming sides and ends extending between the sides to support the jaws. The ends have a central portion in which the frames are pivotally engaged through adjacent ends for rotation about a common axis between set and closed positions and outer portions on each side of the central portion of the jaws. At least one actuator capable of rapidly and forcefully effecting the rotation is present. The actuator has two arms spring biased at one end so that the other ends, which terminate in rings encircling adjacent ends of both frames on opposite sides of the axis would, if unobstructed, move apart to a distance substantially greater than the length of the frame ends. There are trigger means for releasably maintaining the trap in set position. The trigger means comprises a trigger lever pivotally connected to a first frame and extending, when the trap is in the set position, to engage releasably the second frame at first and second points, spaced from each other. The trigger has contact means extending, when the trap is in the set position, from the trigger lever across the trap. Movement of the contact means moves the lever from engagement of the first and second points and thus releases the trap from the set position. The trap is particularly useful for trapping long legged animals.

14 Claims, 3 Drawing Figures

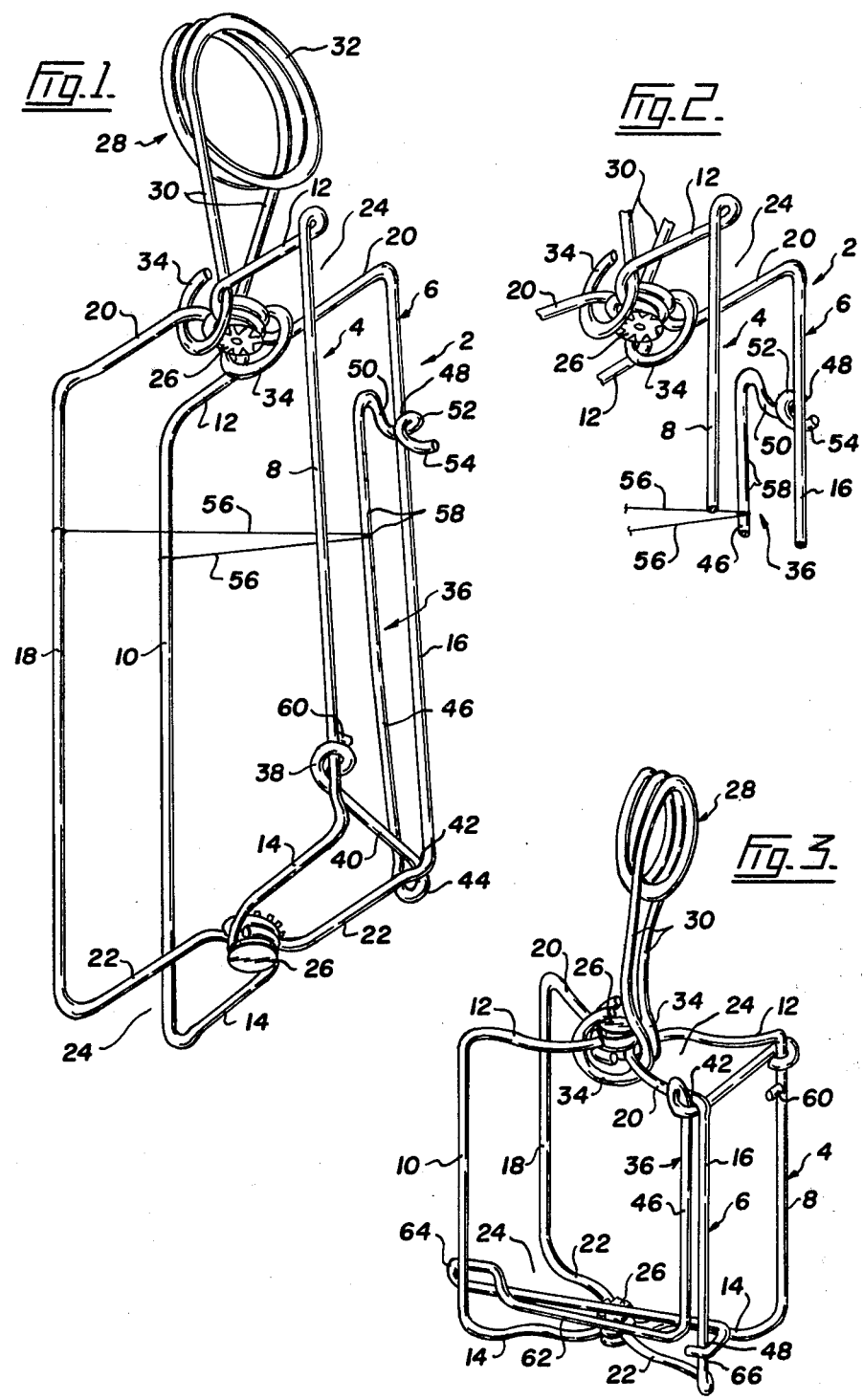

ROTATING FRAME ANIMAL TRAP WITH IMPROVED TRIGGER

FIELD OF THE INVENTION

This invention relates to a rotating frame animal trap, and, more particularly, to such a trap having a novel trigger.

DESCRIPTION OF THE PRIOR ART

The most common triggers used to actuate the release mechanism for rotating frame traps- for example as described in my U.S. Pat. No. 3,010,245 issued on Nov. 28, 1961, has consisted of prongs positioned so that when the trap is set the prongs project inwardly to lie approximately in a plane between the open jaws of the trap. My above United States patent shows a single prong but double prongs have been used and are illustrated, for example, in Lehn's U.S. Pat. No. 2,947,107 and Hofmeister's U.S. Pat. No. 3,421,251. The double prongs project inwardly to lie approximately in the plane between the open jaws of the set trap, as in a single prong trigger. When an animal attempts to pass through the open frames of the set trap it brushes the prong trigger thereby activating the release mechanism and enabling the trap to close under the influence of a spring actuator.

There have been a number of problems with the prong trigger. The prong or prongs are readily visible to an animal, which is therefore discouraged from passing through the trap. All animals are cautious of proceeding through a position that may cause damage to their fur. This caution appears to be particularly pronounced in animals trapped for their fur. Animals dislike making any noise that would warn enemies of their presence and such a noise could result from their fur brushing across the trigger.

Of more practical interest to a trapper is the point that the prong trigger can be avoided by an animal. Mink, for example, are very cunning and agile animals and have been known to pass through a rotating frame trap unharmed simply by avoiding the prong trigger. This is particularly so if the animal to be trapped is relatively large, necessitating large frames. Because of its nature, the prong type trigger leaves large areas of the set trap through which an animal can pass in safety. Of course, if more prongs were used in the same trap to fill these areas, the result would be that an animal would see more obstructions in its way, and would be even less inclined to approach the trap.

Foot plate triggers have been known for many years. They have been used in rotating frame traps, for example, such a trigger is described in my U.S. Pat. No. 3,762,094 issued Oct. 2, 1973. Furthermore, foot triggers are probably the most common triggers used with leg-hold traps. However, a disadvantage with the foot trigger has been its lack of sensitivity. A clear advantage of the trigger is that it leaves unobstructed the frames of the trap. That is the animal does not see any obstruction, for example a prong, in the frame that would arouse its natural caution. Thus, at least in theory, the foot plate trigger appears to offer a good solution to the problem of the caution of the animal. But it presents the problem of a lack of sensitivity. Further, animals have been known to pass over foot plate triggers without stepping on the foot plate as there is a relatively large space around the plate of the open set trap where an animal can tread without touching any part of the trap. In an attempt to reduce the chances of this occuring trappers have set obstacles around such traps to ensure that an animal would step on the foot plate. These include, for example, twigs sticking in the air. Of course the obstacles are time consuming for the trapper to make. And in the same way that an animal may regard the prong type trigger as an obstacle and a potential danger an animal does not like to step on a platform that is elevated (that is under which it can see air) such as the foot plate, as, in the case of a twig, there is a danger that the platform might snap and a noise made to alert the animals enemies. In view of the natural instinct of the animal not to step on such a platform, and in order to increase the effectiveness of such a trigger, trappers set such traps lower in the ground or cover the foot plate with leaves and the like to give the appearance that the foot plate is at ground level and simply a continuation of the ground around the trap. In these cases there is an increased likelihood that branches, leaves, twigs and the like will impede the movement of the foot plate, the movement of the trigger and also the closing action of the trap. Such a trap is also more vulnerable to snow, freezing rain and other natural phenomena that might impede the operation of the trap.

SUMMARY OF THE INVENTION

The present invention sets out to avoid the disadvantages of prior art triggers by providing a trigger in which there is either no obstruction to be seen by an animal in the frames of the trap or any obstruction that is present in the frames is so fine that it appears to an animal that the obstruction can easily be broken.

Accordingly, the present invention, in a first aspect, is an animal trap having two similar frames each having jaw forming sides and ends extending between the sides to support the jaws, the ends having a central portion in which the frames are pivotally engaged through the adjacent ends for rotation about a common axis between set and closed positions and outer portions on each side of the central portion extending to said jaws, at least one actuator capable of rapidly and forcefully effecting such a rotation, which actuator has two arms spring biased at one end so that the other ends, which terminate in rings encircling adjacent ends of both frames on opposite sides of said axis would, if unobstructed, move apart to a distance substantially greater than the length of the frame ends and a trigger means for releasably maintaining the trap in set position, the trigger means comprising a trigger lever pivotally connected to a first frame and extending, when the trap is in the set position, to engage releasably the second frame at a first point and at a second point, spaced from the first point, contact means extending, when the trap is in the set position, from the trigger lever across the trap whereby movement of said contact means moves said lever from engagement with the first and second points and thus releases the trap from the set position.

In a first embodiment the contact means comprises at least one filament extending, when the trap is in the set position, from the trigger lever across at least one frame to engage said at least one frame at a point remote from the lever. The filament may extend from between a point on said trigger lever between the first and second points across at least one frame to engage said at least one frame at a point remote from the lever so that an animal of predetermined size cannot pass through the trap without contacting the filament.

In a further embodiment the trap includes a plurality of filaments each attached to a first jaw forming side of one frame and extending, when the trap is set, across the trap to engage the trigger lever, returning across the trap to engage a jaw forming side of the second frame adjacent the first jaw-forming side of the first frame.

When the contact means is a filament it is desirable that the trigger lever be provided with notches to facilitate engagement of the filament with the lever.

It is desirable, when the contact means is a filament, that the trigger lever be pivotally attached to a first jaw forming side of the first frame, adjacent one end of said first frame, to extend, when the trap is in the set position, to engage, releasably the adjacent end of the second frame at the first point and to extend from the first point along the adjacent jaw-forming side of the second frame to engage releasably the second frame of the second point.

In a further aspect the trigger lever is pivotally attached to a first jaw forming side of the first frame, adjacent one end of the first frame and extends, when the trap is in the set position, to engage releasably the adjacent end of the second frame at said first point, further extending along the adjacent jaw forming side of the second frame to engage releasably the second frame at the second point, adjacent the second frame end, and an extension extending from said trigger lever, from a point adjacent the second point, across the trap, whereby movement of the extension towards the second frame and releases engagement of the trigger lever.

In this last aspect the trigger lever may be provided with a two limbed extension, one limb extending from adjacent the second point across the trap, when the trap is set, the second limb being sapced from and attached to the first and extending back across the trap towards a second point and a catch member, formed on the second limb, engages the second frame at the second point.

BRIEF DESCRIPTION OF THE DRAWINGS

Embodiments of the invention are illustrated, merely by way of example, in the accompanying drawings in which:

FIG. 1 is a general view of a first embodiment according to the present invention;

FIG. 2 is a detail of the trap of FIG. 1; and

FIG. 3 is a general view of a further embodiment of the invention.

DESCRIPTION OF THE PREFERRED EMBODIMENT

Referring to all the drawings, they show a trap 2 having a first frame 4 and a second similar frame 6. The first frame 4 has a first jaw forming side 8 and a second jaw forming side 10. First frame 4 is also made up of first ends 12 and 14 extending between the jaw forming sides 8 and 10 of the first frame 4.

In similar fashion, the second frame 6 comprises a first jaw forming side 16 and a second jaw-forming side 18. Jaw-forming sides 16 and 18 of the second frame 6 are also connected by a first end 20 and a second end 22. The ends 12, 14, 20 and 22 are each formed with a substantially central opening 24 to enable pivotal connection of the first frame 4 and the second frame 6 through pivot pins 26.

The trap is provided with a spring actuator 28 comprising two arms 30 spring biased by a coil spring 32 at one end. The outer ends of arms 30 each terminate in loops 34 that encircle adjacent ends 12 and 20 of the frames 4 and 6. The actuator 28 is such that the rings 34 would, if unobstructed by the frames 4 and 6, move apart a distance substantially greater than the length of the frame ends 12, and 20.

It will be appreciated by the skilled man that all that has been described above is conventional for a rotating frame trap. The present invention resides particularly in the trigger means that releasably maintain the trap in the set position- the position in which it is shown in FIGS. 1 to 3. The release of the trigger causes rapid closing of the trap 2 by rotation of the first frame 4 and the second frame 6 about the pivot pins 26 under the influence of the actuator 28.

In the embodiment of the invention illustrated in FIGS. 1 and 2, the trigger means comprises a trigger lever 36 pivotally connected by the loop 38 to the first frame 4. The trigger lever 36 comprises a first limb 40 extending from the loop 38, when the trap is in the set position as shown in FIGS. 1 and 2, to engage releasably the second frame 6 at a first point 42. In order to facilitate engagement of the trigger lever 36 it is provided with a second loop 44 that acts to form a detent. The illustrated trigger lever 36 is of round wire stock that can be bent fairly easily.

A second limb 46 of the trigger lever 36 extends from the second loop 44 to adjacent a second point 48 on the second frame 6. As illustrated in the drawings second point 48 is spaced from the first point 42. The first point 42 is on the first end 22 of the second frame 6; the second point 48 is on the first jaw forming side 16 of the second frame 6.

The trigger lever 36 is shaped adjacent point 48 to rpovide a third limb 50 having at its end a U-shaped detent 52. A fourth limb 54 extends from the U-shaped detent 52. U-shaped detent 52 provides a safety catch. In the position illustrated in FIG. 1 the trap is in the safe position; in the position illustrated in FIG. 2 the fourth limb 54 of the trigger lever 36 contacts the first jaw-forming side 16 of the second frame 6 and it will be noted that inward movement of the second limb 46 (from the position shown in FIG. 1) of the trigger lever 36 will remove the fourth limb 54 from engagement with the first jaw-forming side 16 of the second frame 6 thus releasing the trap.

In the embodiment illustrated in FIGS. 1 and 2 the trap 2 is provided with contact means in the form of filaments extending, when the trap is in the set position as shown in FIG. 1, across the trap. In the illustrated embodiment two filaments are shown. The filaments 56 extend from the second limb 46 of the trigger lever 36 across the open trap to engage the remote jaw-forming sides of the first frame 4 and the second frame 6. The arrangement is such that if an animal of a predetermined height should attempt to pass through the trap 2 it will contact the filaments 56 thus forcing the fourth limb 54 of the trigger lever 36 from out of contact with the first jaw forming sides 16 of the second frame 6. By so doing it removes the retaining force acting against the opening force of the actuator 28. The trap 2 is therefore vigourously driven to the closed position under the influence of the actuator 28.

It should be emphasized that although two filaments 56 are shown any number of filaments from one upwards can be used depending entirely on what is required and what the trapper may have found useful in any particular circumstance. The filaments will normally be fairly slack. The illustrated arrangement of the filament has the advantage that smaller animals can pass below the filament and will not release the trap. A common disadvantage in trapping is that animals are caught that were not intended to be caught. These unintended victims are generally referred to as trash.

In order to facilitate engagement of the filaments 56 with the second limb 46 of the trigger lever 36 the second limb 46 is provided with a plurality of notches 58. The filaments 56 may be desirably be of, for example, nylon and should be transparent and substantially invisible. Instead of notches 58 the second limb 46 can be sinuous.

It is desirable to form a lug 60 on the first jaw forming side 8 of the first frame 4 in order to prevent the loop 38 moving along the jaw forming side 8 of the first frame 4.

FIG. 1 illustrates a preferred embodiment in which the jaw forming sides 8, 10, 16, and 18 are substantially longer than the ends 12, 14, 20 and 22. In a typical embodiment the ratio may be 2 to 1. This means that the trap can be used to catch relatively long legged animals, for example, foxes, coyotes, lynx and wolves. To catch such animals the trap of FIG. 1 would have the jaw forming sides 8, 10, 16 and 18 arranged substantially vertically.

In the embodiment illustrated in FIG. 3, in which the same reference numerals are used for the same parts as shown in FIGS. 1 and 2, the trigger lever 36 extends, when the trap is in the set position as shown in FIG. 3, to engage releasably the adjacent end 20 of the second frame 6 at a first point 42. The second limb 46 of the trigger lever 36 extends downwardly into a third limb 62 that extends across the frame, ends at 64 and returns across the frame to form a detent or hook 66 that engages the second frame at the second point 48. The arrangement is such that movement downwardly of the third limb 62 will release the detent 66 from engagement at points 42 and 48 with the second frame 6. That is the actuator 28 is then allowed to close the trap. The embodiment as shown in FIG. 3 is useful in the position illustrated in FIG. 3 and the third limb 62 of the trigger lever 36 therefore acts as a foot tread to actuate the trap. That is the embodiment of FIG. 3 dispenses with the filaments 56 illustrated in FIGS. 1 and 2. The path through the trap 2 of FIG. 3 is substantially completely unobstructed.

The trigger shown in FIG. 3 is of particular value in that it is useful for traps having frames of the shape described and claimed in my U.S. Pat. No. 3,760,531, issued Sept. 25, 1973. That shape is generally trapezoidal, that is the frame ends are longer at one end of the trap, adjacent the actuator, than at the other.

I claim:

1. An animal trap having two similar frames each having jaw forming sides and ends extending between the sides to support the jaws, the ends having a central portion in which the frames are pivotally engaged through adjacent ends for rotation about a common axis between set and closed positions and outer portions on each side of the central portion extending to said jaws, at least one actuator capable of rapidly and forcefully effecting such a rotation, which actuator has two arms spring biased at one end so that the other ends, which terminate in rings encircling adjacent ends of both frames on opposite sides of said axis would, if unobstructed, move apart to a distance substantially greater than the length of the frame ends and a trigger means for releasably maintaining the trap in set position, the trigger means comprising a trigger lever pivotally connected to a first frame and extending, when the trap is in the set position, to engage releasably the second frame at a first point and at a second point, spaced from the first point, contact means extending, when the trap is in the set position, from the trigger lever across the trap whereby movement of said contact means moves said lever from engagement of the first and second points and thus releases the trap from the set position.

2. An animal trap as claimed in claim 1 in which said contact means comprises at least one filament extending, when the trap is in the set position, from the trigger lever across at least one frame to engage said at least one frame at a point remote from the lever.

3. An animal trap as claimed in claim 2 in which the filament extends from between a point on said trigger lever between said first and second points across at least one frame to engage said at least one frame at a point remote from the lever so that an animal of predetermined shape and size cannot pass through the trap without contacting the filament.

4. An animal trap as claimed in claim 2 including a plurality of filaments each attached to a jaw-forming side of one frame and extending, when the trap is in the set position, across the trap to engage the trigger lever, returning across the trap to engage a jaw-forming side of the second frame adjacent said jaw forming side of said first frame.

5. An animal trap as claimed in claim 4 in which the trigger lever is provided with notches to facilitate engagement of the filament.

6. An animal trap as claimed in claim 2 in which the trigger lever is pivotally attached to a first jaw-forming side of the first frame, adjacent one end of said first frame, and extending, when the trap is in the set position, to engage releasably the adjacent end of the second frame at said first point and extending from the first point along the adjacent jaw-forming side of the second frame to engage releasably the second frame at the second point.

7. An animal trap as claimed in claim 2 in which the trigger lever is formed from a single piece of round wire stock having a closed loop to engage said first frame, the lever, when the trap is in the set position, extending across the trap and being shaped to releasably engage a first end of the second frame at the first point and extending from the first point to extend along a jaw-forming side of said second frame and being shaped to releasably engage said second frame at the second point.

8. An animal trap as claimed in claim 3 provided with a lug adjacent the end of said first jaw-forming side to restrict movement of the closed loop along said jaw-forming side.

9. An animal trap as claimed in claim 3 in which the trigger lever is provided with a safety catch comprising a U-shaped detent engaging said second frame at said second point in such a way that movement of the filament cannot pull the trigger lever from engagement with the second frame at said second point.

10. An animal trap as claimed in claim 2 in which the filament is transparent and substantially invisible.

11. An animal trap as claimed in claim 10 in which the filament is of nylon.

12. An animal trap as claimed in claim 2 in which the jaw forming sides are about twice as long as the ends of the trap so that, when the trap is set with said common axis substantially vertical, it can be used to catch relatively long legged animals.

13. An animal trap as claimed in claim 1 in which the trigger lever is pivotally attached to a first jaw forming side of the first frame, adjacent one end of said first frame and extends, when the trap is in the set position, to engage releasably the adjacent end of the second frame at said first point, further extending along the adjacent jaw forming side of the second frame to engage releasably the second frame at the second point, adjacent the second frame end, and an extension extending from said trigger lever, from a point adjacent the second point, across the trap, whereby movement of the extension towards the second frame end releases engagement of the trigger lever.

14. An animal trap as claimed in claim 13 in which the trigger lever is provided with a two limbed extension, one limb extending from adjacent the second point across the trap, when the trap is in the set position, the second limb being spaced from and attached to the first and extending back across the trap towards the second point;

a catch member formed on the second limb to engage the second frame at the second point.

* * * * *